Patented Sept. 9, 1924.

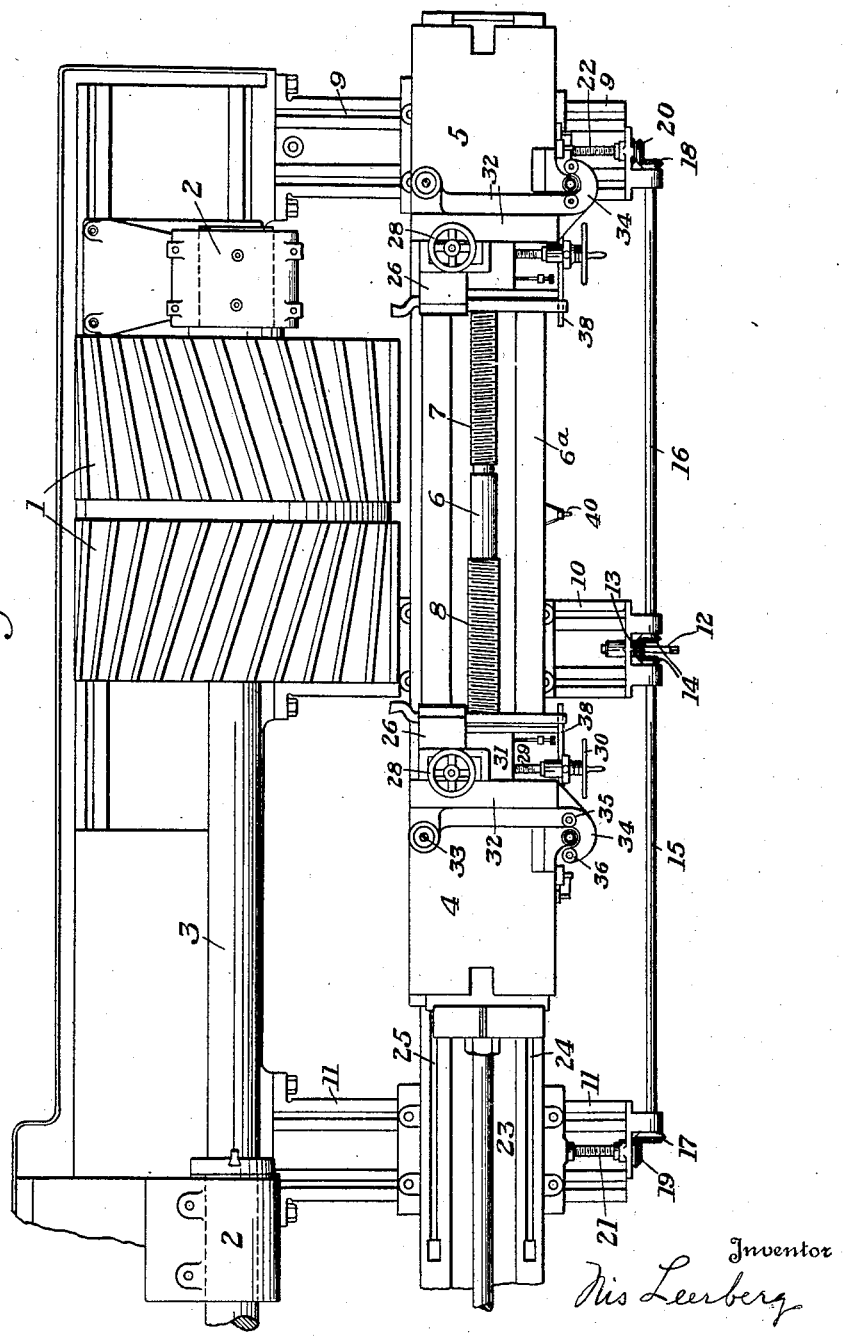

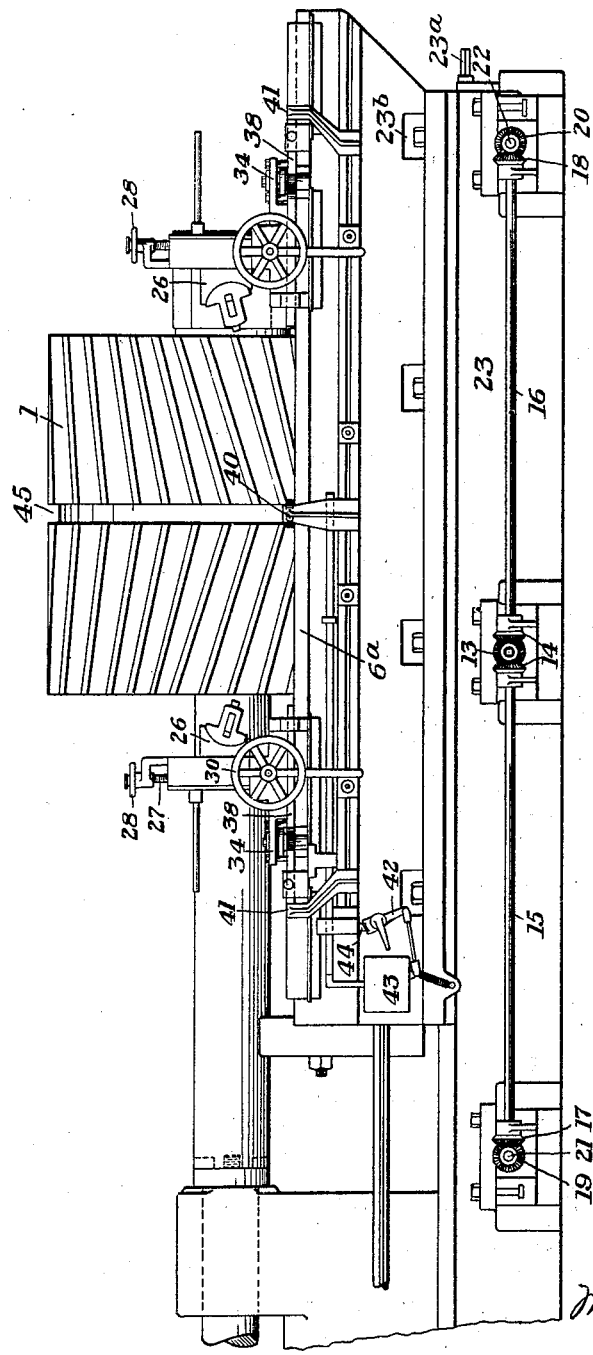

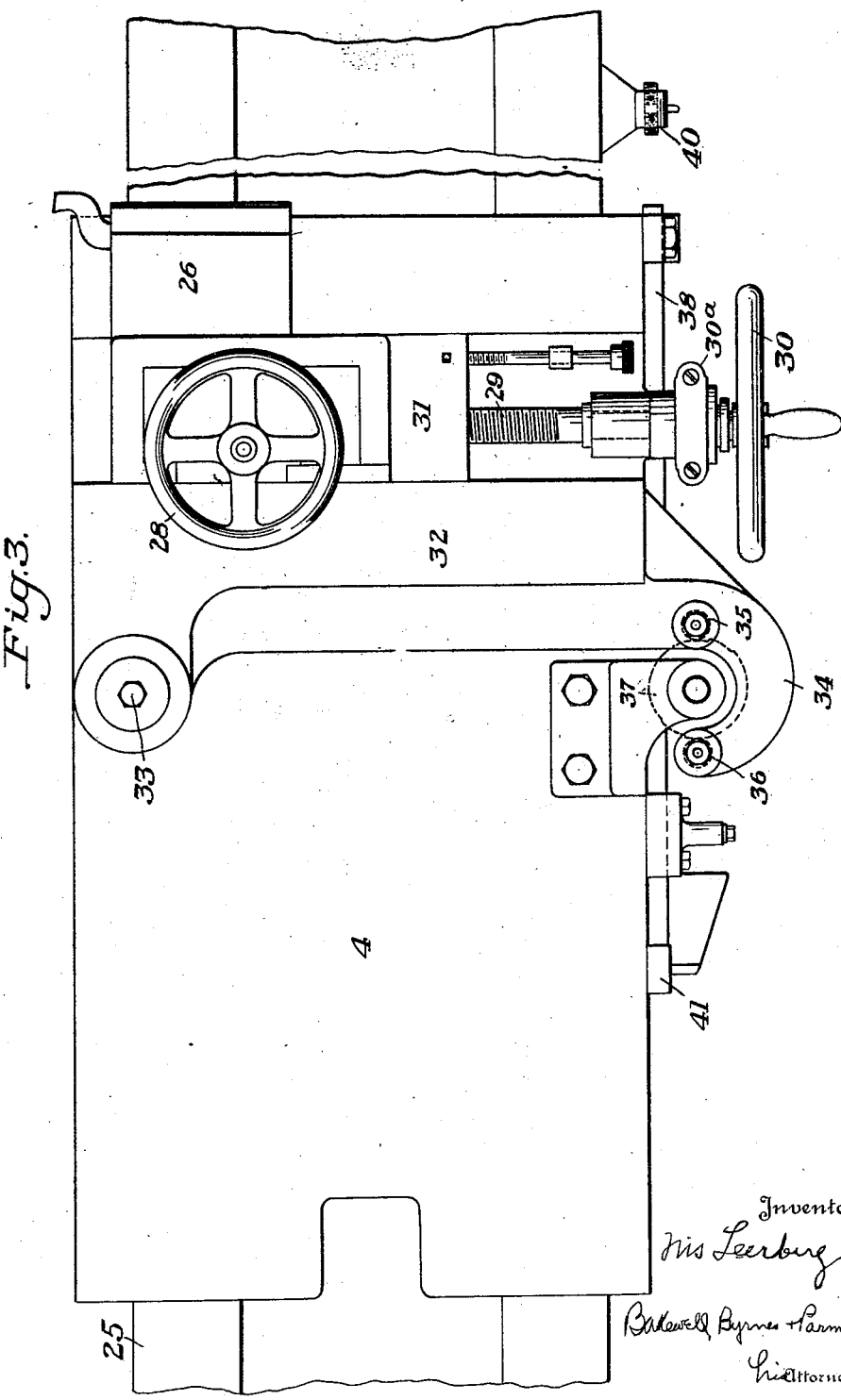

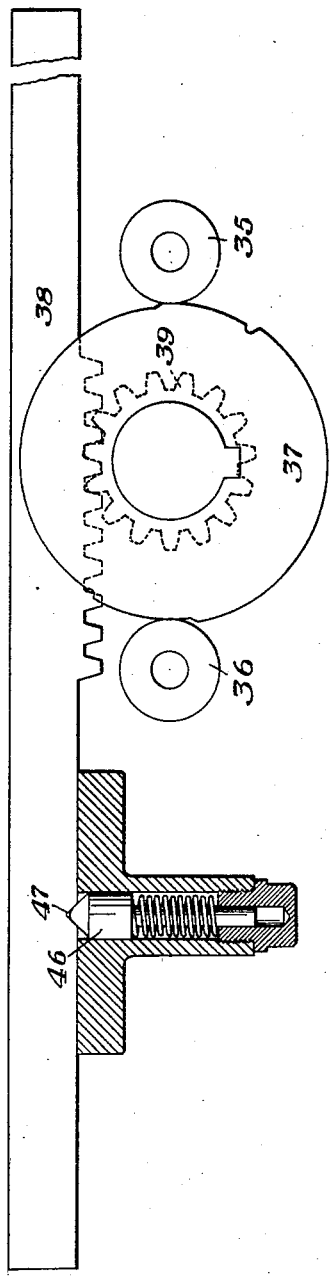
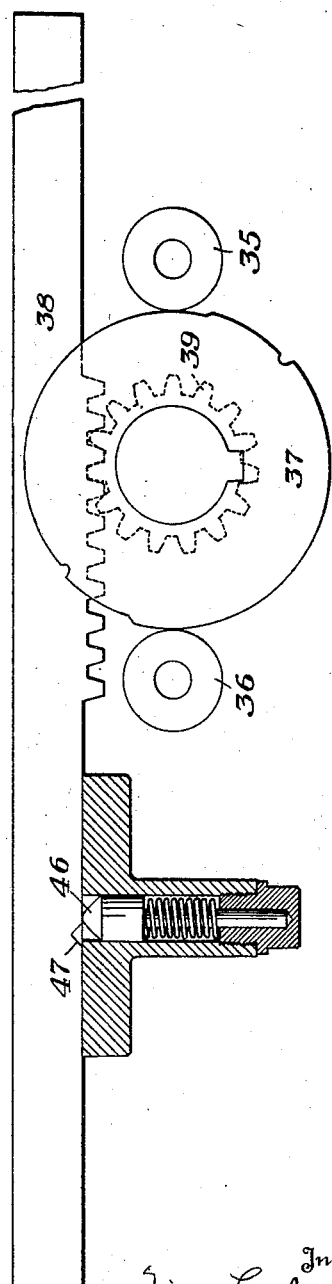

1,507,704

UNITED STATES PATENT OFFICE.

NIS LEERBERG, OF EDGEWOOD, PENNSYLVANIA, ASSIGNOR TO MESTA MACHINE COMPANY, OF PITTSBURGH, PENNSYLVANIA, A CORPORATION OF PENNSYLVANIA.

GEAR-PLANING MACHINE.

Application filed November 5, 1920. Serial No. 421,912.

*To all whom it may concern:*

Be it known that I, NIS LEERBERG, a citizen of the United States, residing at Edgewood, Allegheny County, Pennsylvania, have invented a new and useful Improvement in Gear-Planing Machines.

The present invention relates specifically to tool holders for tools used in such machines.

In cutting gears of the above mentioned type, it is customary to provide on the blank a central groove and in the operation of planing the teeth, the tools must be so arranged that they may be brought closely together at the center in order that the size of the central groove may be within reasonable limits. The well known goose-neck tool has many advantages in planing machines for cutting gears of the type in question and it is the object of my invention to devise tool holders which will permit the goose-neck tool to be used and which will also make it possible to operate the machine to plane teeth on blanks without the necessity of providing a central groove of undue size.

An object of my invention is to provide a machine to fulfill the requirements set forth above and which will be simple and rugged in construction and accurate in operation.

My invention will be better understood by reference to the following description taken in connection with the accompanying drawings forming a part of this specification and in which—

Figure 1 is a plan view of a portion of a machine embodying my invention;

Figure 2 is an elevation of a part of a machine embodying my invention;

Figure 3 is an enlarged view of one of the tool holders, and

Figures 4 and 5 are enlarged views of the details of construction.

In the drawings I have omitted the driving motors for operating the tools and the mechanism for rotating the blank and also the indexing means and various other details of construction of planing machines because these features form no part of the present invention and are well known in the art and the showing of the same is not necessary for a complete understanding of my invention. I have shown only such parts of a planing machine as are necessary to a complete understanding of my invention.

In the drawings the blank 1 is mounted and supported by bearings 2 or by any other suitable means. The arbor 3 is rotated by any suitable mechanism, not shown. The extent of rotation of the arbor 3 during each cutting movement of the tools depends upon the angle of the teeth with respect to the axis of the blank.

The tool carriers 4 and 5 are mounted on a slide $6^a$, and are given reciprocating motion away and towards each other by means of shaft 6, which has oppositely threaded portions 7 and 8 engaging nuts bolted to the underside of the tool carriers. The shaft 6 is rotated by any suitable means, not shown. The direction of rotation of shaft 6 is controlled by the reverse lever 42 and trip dog 44, which in this case actuates the master switch 43 for an electric motor.

The slide $6^a$ is mounted on base 23, so that lateral adjustment may be obtained. By means of screw $23^a$, the slide is moved until the two tools come into proper relation with the faces of the gear blank. After adjustment has been effected, the slide is bolted down by means of bolts $23^b$.

The base 23 is mounted on slideways 9, 10 and 11 so that the position of the tools with respect to the blank diameter may be changed. This base is moved to and from the work on the slideways by means of power applied to the shank 12 by which a bevel gear 13 is rotated. The bevel gear 13 meshes with the bevel gears 14 mounted on shafts 15 and 16, which in turn have on the ends thereof bevel gears 17 and 18 meshing with bevel gears 19 and 20 fastened on the ends of screws 21 and 22, respectively. When the shank 12 is rotated, the screws 21 and 22 are rotated and the tool carriers 4 and 5 are moved toward or from the work 1 because of the engagement of the screws 21 and 22 with threaded portions on the base 23.

The tools are adustable in the holders. Since the adjusting means are identical a description of one will be sufficient. The tool holding block 26 is vertically adjustable with respect to the holder 4, as shown in Figure 2, the said block 26 being moved by screw 27 and handwheel 28. These members are laterally adjustable with respect to the member 4 by means of a screw 29 and handwheel 30, or by ratchet 30ª when taking a cut. The screw 29 engages a threaded portion in the block 31 which carries the block 26 and its adjusting means.

The blocks 26 and 31 are carried by a member 32 which is pivoted at 33. This member has an extension 34 thereon which is provided with two rollers 35 and 36. These rollers are preferably spaced apart and on a line parallel with the line of reciprocation of the holders 4 and 5. This construction is shown in the enlarged view of Figure 3. Mounted between the rollers 35 and 36 is a cam 37, the surface of which is so formed that the same is in contact with the rollers 35 and 36 at all positions. The cams and rollers are shown in further detail in Figures 4 and 5. The cam is rotated by a rack 38 and pinion 39 shown in Figures 4 and 5. The rack 38 is carried by the tool carrier 4 and as the carrier is moved to the right, the rack bar engages a center stop 40, which arrests the movement of the rack bar thus causing a relative movement of it with respect to the tool carrier which carries the pinion 39 and the cam 37. This relative movement causes a rotation of the cam which is such as to cause the member 32 to rotate around a pivot 33 in a counter-clockwise direction as shown in Figure 1. This rotation moves the tool against the work so that when the shaft 6 is reversed and the tool carrier 4 moves to the left in Figure 1, the tool will be in engagement with the work during the cutting movement. The parts are held in this position during the cutting movment by a detent 46 entering a notch 47 in the rack bar 38.

As the member 4 approaches its return position, the rack bar 38 engages a stop 41 which causes a relative movement of the rack with the holder 4 having the effect of rotating the cam in a direction opposite to that which was given to the cam when the rack 38 engaged the stop 40. This causes a clockwise movement of the member 32 around the pivot 33, thus relieving the tool with respect to the work.

The cams 37 are simultaneously operated and produce a similar effect upon the tools so that both tools are thrown into relieved position as they move toward the center of the blank, and are in engagament with the work as they travel from the center towards the ends of the work, this operation being automatic and positive in its action.

From the foregoing it will be seen that my machine has the advantage that the tools may be brought almost into contact with each other at the end of the return movement, so that the center groove 45 may be relatively very narrow. Furthermore, the arrangement above specifically described provides a tool holder which is extremely rugged and therefore correspondingly accurate, and also a tool holder, by the use of which the tool is automatically relieved on the return stroke.

The described arrangement affords an accurate means of holding the tooth in cutting position and, on the whole, is very satisfactory in use as a simple and rugged construction for performing the heavy but accurate work required of such machines.

From the foregoing description the operation of the machine will be manifest and need not be set forth at length in this specification.

I claim:

1. In a gear planing machine, the combination of a pivotally mounted tool holder having an extension thereon, two rollers on said extension and a cam mounted between and in constant contact with said rollers, and means for rotating both of said cams to rotate said holder around its pivot and means for reciprocating said tool holder.

2. In a gear planing machine, the combination of a screw driven slide, a pivotally mounted tool holder mounted on said slide and having a single tool holding portion and an extension thereon, rollers in said extension, a cam between said rollers and in contact with both of said rollers, means for rotating said cam to move the tool in said holding portion into cutting position, means for automatically rotating said cam to remove the tool out of contact with the work during its return stroke and means for reciprocating said holder.

3. In a gear planing machine, the combination of a screw driven slide, a pivoted tool holder mounted on said slide and having a single tool socket in the line of movement of said holder, an extension on said holder, a cam engaging two points on said extension, means for automatically moving said holder around said pivot at each end of its reciprocating movement and means for reciprocating said holder.

4. In a gear planing machine, the combination of two pivoted reciprocable tool holders, each having an extension thereon, a cam engaging two points on each extension, and means for rotating the cams to cause the tools to engage the work on the cutting stroke and to relieve the tools on the return stroke and means for reciprocating said holders.

In testimony whereof I have hereunto set my hand.

NIS LEERBERG.

Certificate of Correction.

It is hereby certified that in Letters Patent No. 1,507,704, granted September 9, 1924, upon the application of Nis Leerberg, of Edgewood, Pennsylvania, for an improvement in "Gear-Planing Machines," errors appear in the printed specification requiring correction as follows: Page 2, line 86, claim 1, strike out the words "both of" and for the word "cams" read *cam;* same page and claim, line 85, after the word "with" insert the words *both of;* and that the said Letters Patent should be read with these corrections therein that the same may conform to the record of the case in the Patent Office.

Signed and sealed this 4th day of November, A. D. 1924.

[SEAL.]
                                      KARL FENNING,
*Acting Commissioner of Patents.*